US012181900B2

(12) United States Patent
Mason et al.

(10) Patent No.: US 12,181,900 B2
(45) Date of Patent: Dec. 31, 2024

(54) FUEL PRESSURE REGULATOR, METHOD OF REGULATING FUEL PRESSURE AND METHOD OF MEASURING A VOLUME OF FLUID FLOW

(71) Applicant: BRAMBLE ENERGY LIMITED, Crawley (GB)

(72) Inventors: Thomas James Mason, Crowborough (GB); Erik Charles Engerbretsen, London (GB)

(73) Assignee: BRAMBLE ENERGY LIMITED, Crawley (GB)

( * ) Notice: Subject to any disclaimer, the term of this patent is extended or adjusted under 35 U.S.C. 154(b) by 101 days.

(21) Appl. No.: 17/997,423

(22) PCT Filed: Apr. 29, 2021

(86) PCT No.: PCT/GB2021/051035
§ 371 (c)(1),
(2) Date: Oct. 28, 2022

(87) PCT Pub. No.: WO2021/220003
PCT Pub. Date: Nov. 4, 2021

(65) Prior Publication Data
US 2023/0161362 A1 May 25, 2023

(30) Foreign Application Priority Data
Apr. 29, 2020 (GB) .................................... 2006309

(51) Int. Cl.
*G05D 16/20* (2006.01)
*G05D 7/06* (2006.01)

(52) U.S. Cl.
CPC ....... *G05D 7/0647* (2013.01); *G05D 16/2033* (2013.01)

(58) Field of Classification Search
CPC .................. G05D 7/0647; G05D 16/2033
See application file for complete search history.

(56) References Cited

U.S. PATENT DOCUMENTS

| 7,325,561 B2* | 2/2008 | Mathison ............... B60K 15/00 141/197 |
| 9,464,761 B2* | 10/2016 | Nagura ..................... F17C 5/06 |
| 2004/0023083 A1 | 2/2004 | Yang et al. |

(Continued)

FOREIGN PATENT DOCUMENTS

| DE | 102011105054 A1 | 12/2012 |
| JP | 2005267969 A | 9/2005 |

(Continued)

OTHER PUBLICATIONS

Machine English translation of WO2007/055370A1 (Year: 2024).*

(Continued)

*Primary Examiner* — Hailey K. Do
(74) *Attorney, Agent, or Firm* — Myers Bigel, P.A.

(57) ABSTRACT

A fuel cell comprising a fuel pressure regulator apparatus on a fuel input line of the fuel cell, the apparatus comprising a first and a second valve connected in series by a fluid flow path defining an open volume between the two valves a pressure monitor device downstream of the second valve; and a controller connected to each valve for opening and closing each valve in a pulsed manner.

20 Claims, 11 Drawing Sheets

(56) References Cited

U.S. PATENT DOCUMENTS

| | | | |
|---|---|---|---|
| 2005/0064255 A1 | 3/2005 | Blaszczyk et al. | |
| 2005/0223979 A1 | 10/2005 | Shajii et al. | |
| 2007/0157969 A1 | 7/2007 | Gross | |
| 2009/0095363 A1* | 4/2009 | Nakakubo | F16K 99/0001 137/843 |
| 2013/0213117 A1 | 8/2013 | Micklash et al. | |
| 2014/0212777 A1 | 7/2014 | Hofer et al. | |
| 2019/0011936 A1 | 1/2019 | Nishizato | |
| 2019/0243392 A1 | 8/2019 | Ding et al. | |

FOREIGN PATENT DOCUMENTS

| | | | | |
|---|---|---|---|---|
| JP | 2015103426 A | | 6/2015 | |
| WO | 2006065426 A2 | | 6/2006 | |
| WO | WO-2007055370 A1 * | | 5/2007 | G05D 16/2033 |

OTHER PUBLICATIONS

EP Examination Report corresponding to EP21725239.4; Dated: Aug. 21, 2023, (6 pages).

International Search Report and Written Opinion corresponding to PCT/GB2021/051035; Dated Jul. 12, 2021 (12 pages),.

UK Intellectual Property Office Combined Search and Examination Report corresponding to GB2006309.5; Dated Oct. 23, 2020 (9 pages),.

UK Intellectual Property Office Examination Report corresponding to GB2006309.5; Dated Apr. 7, 2022 (3 pages),.

UK Intellectual Property Office Examination Report corresponding to GB2006309.5; Dated Jun. 9, 2021 (3 pages),.

EP Examination Report corresponding to EP21725239.4; Dated: Jan. 31, 2024, (6 pages).

EP Examination Report corresponding to EP21725239.4, Jun. 10, 2024, (7 pages).

* cited by examiner

FUEL PRESSURE REGULATOR, METHOD OF REGULATING FUEL PRESSURE AND METHOD OF MEASURING A VOLUME OF FLUID FLOW

RELATED APPLICATIONS

This application is a 35 U.S.C. § 371 national stage application of PCT Application No. PCT/GB2021/051035, filed on Apr. 29, 2021, which claims priority from United Kingdom Patent Application No. 2006309.5, filed on Apr. 29, 2020, the contents of which are incorporated herein by reference in their entireties. The above-referenced PCT International Application was published in the English language as International Publication No. WO 2021/220003 A1 on Nov. 4, 2021.

The present invention relates to a fuel pressure regulator capable of controlling fluid flow and pressure. The present invention also relates to a method of regulating fluid flow and pressure and further provides for a method of measuring a volume of a fluid that is flowing through a fuel pressure regulator.

The present invention has particular application to fuel cells, for example solid-polymer-electrolyte fuel cells.

A fuel cell is an electrochemical device which generates electrical energy and heat from an oxidant (e.g. pure oxygen or air) and a fuel (e.g. hydrogen or a hydrogen-containing mixture, or a hydrocarbon or hydrocarbon derivative). Fuel cell technology finds application in portable, mobile and stationary applications, such as power stations, vehicles and laptop computers.

Typically, a fuel cell comprises two electrodes, an anode and a cathode, which are separated by an electrolyte membrane that allows ions (e.g. hydrogen ions), but not free electrons, to pass through from one electrode to the other. A catalyst layer on the electrodes accelerates a reaction with the fuel (on the anode electrode) and oxidant (on the cathode electrode) to create or consume the ions and electrons. The electrons freed at the anode form an electrical current, which is used to perform work and then flows to the cathode where the electrons are consumed.

Fuels such as hydrogen are stored in, and supplied from, a fuel storage held at well above atmospheric pressure. A design requirement of fuel cells requires the fuel pressure to be regulated down before feeding the fuel cell. In the art, the pressure reduction is done in a mechanical fashion, by a diaphragm flow restrictor.

Diaphragm flow restrictors regulate fuel from high to low pressure by a single- or two-stage regulator utilising springs and diaphragms. Rupture of the diaphragm results in the venting of gas which can cause harm, depending on the flammability and toxicity of the gas and can put the fuel cell out of service.

A further requirement in the design of fuel cells are industry guidelines and safety standards. For example, according to British Standard 62282-2 fuel cells should have a minimum of two solenoid valves in series on any fuel input line. Such solenoid valves are known as "normally closed valves" because they are closed when there is no power. Any fuel cell meeting British standards should have two such valves, at least two valves being necessary in case one of the two valves fail.

The known solenoid valves of the prior art are not designed to regulate fuel from high to low pressure, they only act only as shut off valves. Therefore, fuel cell systems of the prior art typically comprise both a diaphragm flow restrictor and two solenoid valves.

Solenoid valves with the lowest power rating available use at least 1 W of power each and keeping normally closed solenoid valves open draws power from the fuel cell.

For the operation of fuel cells, especially those of a lower wattage such as fuel cells capable of producing less than 200 W, and in particular around 20 W, the loss of 2 W of the power output could represent 10% of the power generated by the whole system. Thus, the presence of two "always on" solenoid valves holds back the scale-down possibilities of such fuel cells because such valves drain power from fuel cells.

According to a first aspect of the present invention, there is provided a fuel cell comprising a fuel pressure regulator apparatus on a fuel input line of the fuel cell. The apparatus comprises a first and a second valve connected in series by a fluid flow path defining an open volume between the two valves, a pressure monitor device downstream of the second valve, and a controller connected to each valve for opening and closing each valve in a pulsed manner. The fuel pressure regulator apparatus may be separated from the fuel cell itself and envisioned as a separate aspect of the invention.

The fuel pressure regulator of the invention reduces the pressure of a fuel as it flows, for example from a fuel source to a fuel consumer along the fuel line. Fuel will flow along the fuel line, the first valve will open, fuel will flow into and fill the volume between the two valves and then the second valve will open, and the fuel will continue to flow downstream, e.g. to the fuel consumer. This mechanism reduces the pressure of the fuel as it moves through the valves. The valves are controlled so as to be able to fire continually to allow sustained flow of fuel from the source into the destination (e.g. a fuel consumer).

The fluid flow path between the first and the second valve connected in series is termed an open volume. Such an open volume allows a free flow of fuel between the valves, i.e. nothing significantly impedes the flow of the fuel from the output of the first valve to the input of the second valve. The valves are connected in series, meaning that the fuel output of the first valve directly (without impedance) inputs to the input of the second valve. The open volume consists of nothing other than the space, volume or void to allow fuel to flow unimpeded between the two valves. The volume is devoid of anything which would (significantly) impede or alter the flow of the fuel from one valve to the next. The volume being devoid of anything which impedes the flow does not limit the volume to not having sensors e.g. pressure sensors, or other such components which would not interfere with the flow of fuel between the two valves.

Preferably the apparatus comprises a fuel line having a high-pressure side connected to an input of the first valve and a low-pressure side connected to the output of the second valve.

More preferably, an output of the first valve is connected to an input of the second valve by the fluid flow path, the fluid flow path defining a fixed volume between the valves.

The apparatus and their later described methods and uses described herein are improvements on those of the prior art because they can replace diaphragm regulators used to reduce fuel pressure.

The system is for use with a fuel cell, as in particular, the methods and fuel supply systems of the present invention can reduce pressure of or regulate fuel pressure flow into fuel cells. This improves control and regulation of fuel flow which can increase fuel cell efficiency.

Preferably, the valves are solenoid valves. Preferably, the valves are normally closed solenoid valves. Preferably the valves are disposed on a surface of the substrate, for example a metal block.

When two solenoid valves are used to reduce pressure on a fuel inlet of a fuel cell, the presence of these valves means a fuel cell will meet the previously described requirements in industry guidelines.

Use of a series of solenoid valves for regulating fuel flow represents a significant efficiency advantage over the prior-art systems, because operating solenoid valves in a pulsed manner uses much less power than the "always on" two solenoid safety valves of the prior-art fuel cells. Power drain on the fuel cells by component parts of the system is reduced.

Preferably, the controller is configured to open the second valve only when the first valve is closed so that there is not an open fluid flow path from the high-pressure side to the low-pressure side.

Preferably, the controller is configured to open the second valve whilst the first valve is still open, so there is an overlap in the opening of the valves. The first valve will shut before the second valve shuts. Preferably, the overlap time of the opening of the two valves is below 25% of the time open of either valve, or is below 10% of the time open of either valve, or is below 5% of the time open of either valve, or is below 1% of the open time of either valve. Preferably, the overlap time may be less than 10 ms, preferably less than 5 ms, preferably about 4 ms.

The apparatus comprises a pressure monitor downstream of the second valve. This pressure monitor can communicate with the controller, or other such controllers, in order to open the valves when the pressure downstream of the regulator apparatus meets (i.e. drops to) a required predetermined threshold. Preferably, when the pressure monitor measures that the pressure of the fuel has decreased below a predetermined pressure threshold, the valves are triggered to open, e.g. by the valve controller.

When the apparatus is for use as part of or with a fuel cell, or when the apparatus is part of the fuel cell or fuel cell apparatus itself, it is preferable the apparatus or the fuel cell comprises a pressure monitor downstream of the second valve. This allows the flow rate of fuel into the fuel cell to be monitored and regulated. The flow rate is regulated by measuring the pressure drop due to consumption of the fuel and adjusting accordingly. The greater the pressure drop in the fuel the more the valves firing time or periods can be adjusted to allow for a greater fuel flow, and vice versa, if the fuel pressure exceeds a predetermined threshold the valves firing time or periods can be adjusted to decrease the fuel flow.

Preferably, the volume between the valves is between of 0.1-5 $cm^3$. Preferably, the volume between the valves is between 0.2 $cm^3$ and 4 $cm^3$. For example, for a small fuel consumer, i.e. a 20 W fuel cell the volume between the valves may be around 0.2 $cm^3$, or for a larger fuel cell stack of 500 W the volume between the valves may be 4 $cm^3$. The user would be able to calculate an appropriate volume for the system with which they chose to use the apparatus, systems and methods of the invention.

In embodiments, the apparatus is capable of dropping or decreasing the pressure of the fuel by at least 5 fold, i.e. the pressure of the fuel leaving the apparatus is 5 times less than the pressure of the fuel entering the apparatus. Preferably the apparatus is capable of dropping or decreasing the pressure of the fuel by at least 10 fold, or at least 15 fold, or at least 20 fold, or at least 30 fold, or at least 40 fold, or at least 50 fold. Preferably, the fuel decreases in pressure from about 10 bar to between 0.2 and 0.6 bar, which is a drop of between around 16.5 fold and around 33.3 fold, preferably the fuel pressure decreases from about 10 bar to between around 0.3 bar, which is a 33.3 fold drop in fuel pressure. The valves are controlled so as to be able to fire continually to allow sustained flow of fuel from the source into the destination (e.g. the fuel consumer). The number of valve triggering events per time period (e.g. minute or hour) is determined by the length of the period. Vales operating with a period time of 500 ms to 50 ms would have between 120 and 1200 valve triggering events (valve opening and closing events) per valve per minute. Preferably, the valves have between 120 and 1200 valve triggering events per minute. Preferably around or at least 120 valve triggering events per minute, preferably at least 240 valve triggering events per minute, preferably at least 600 valve triggering events per minute, preferably at least 800 valve triggering events per minute. Preferably there are around or at least 1200 valve triggering events per minute.

The apparatus allows the regulation fuel pressure of continual gas flow from a source to a consumer or target, e.g. a fuel cell. The apparatus can have in embodiments excess of or greater than 50 mL flow of fuel per minute, preferably excess of 100 mL flow of fuel per minute, preferably excess of 250 mL flow of fuel per minute, preferably excess of 500 mL flow of fuel per minute, preferably excess of 1 litre flow of fuel per minute. Preferably, the method allows regulation of at least 50 mL flow per minute, preferably at least 100 mL flow of fuel per minute, preferably at least of 250 mL flow of fuel per minute, preferably at least 500 mL flow of fuel per minute, preferably at least 1 litre flow per minute. A greater flow per minute may be used for those fuel cells of a relatively higher wattage, for example the apparatus can operate to control fuel flow into fuel cells at 1.1 litre flow per minute for a 100 W fuel cell stack, or the apparatus can operate to control fuel flow into fuel cells at 80 mL flow per minute for an 8 W fuel cell stack. For example, the fuel cells can have a power rating of between 8 W and 100 W fuel cells.

A fuel cell may also comprise an outlet valve or valve apparatus, designed and controlled in a similar manner to control the flow of consumed fuel out of the fuel cell. This valve or valve apparatus may also preferably comprise solenoid valve(s) with all the advantages of those valves described herein. An outlet valve allows periodic purging (i.e. a purge event) of a fuel cell of water and nitrogen build up, products of the fuel cell generating power. The valve systems/apparatus described herein are capable of interacting with this outlet valve (e.g. via a controller) to react and provide constant fuel when the pressure drops as a result of any purge events. Purge events can be time or voltage based. Time based purge events ensure a regular refresh of the anode, independent of fuel cell performance whilst voltage based purge events are linked to a decay in module voltage due to build-up of water or nitrogen on the anode, so that when a threshold is reached, a purge event is triggered.

According to a second aspect of the present invention, there is provided a method of regulating fuel pressure in a fuel cell comprising flowing a fuel through a fluid flow path defining a volume between a first and a second valve connected in series where the output of the first valve directly inputs to the input of the second valve, monitoring the pressure of the fuel downstream of the second valve, and controlling each valve by opening and closing each valve in a pulsed manner.

Preferably, the method includes controlling both valves in a pulse-width modulated manner.

Preferably the method includes opening the second valve only when the first valve is closed.

Preferably, there is an overlap in the opening of the two valves. Preferably, the second valve opens whilst the first valve is still open. Preferably, the overlap in the opening of the two valves is below 25% of time open of either valve or is below 10% of the time open of either valve, or is below 5% of the time open of either valve, or is below 1% of the open time of either valve. Preferably, the overlap time may be less than 10 ms, preferably less than 5 ms, preferably about 4 ms.

In embodiments, the time gap between the closure of one valve and the opening of the other or the next valve is less than 100 milliseconds (ms), or the time gap is less than 50 ms, or the time gap is less than 20 ms, or the time gap is less than 10 ms, or the time gap is less than 5 ms. Preferably, the time gap is around or less than 20 ms. In preferred embodiments, the time gap is around 20 ms. In other preferred embodiments, the time gap is around 4 ms. In embodiments, the time gap is between 4 ms and 100 ms, or between 4 ms and 50 ms, or between 4 ms and 20 ms. Preferably, the time gap is between 4 ms and 20 ms.

The valves are opened in a pulsed manner, i.e. each valve is triggered to open in a pulsed manner. This is the duty cycle of the valve. Larger regulator apparatus or systems could use a larger pulse time, smaller apparatus or systems a smaller pulse time. Thus, preferably, the pulse time or duty cycle of each valve is between 1 ms and 100 ms per valve. Preferably, the duty cycle is 1 ms and 15 ms per valve, or between 5 ms and 11 ms per valve. Preferably, the pulse time is 8 ms or around per valve. Preferably, the pulse time is around 100 ms or around per valve.

In embodiments, the time between the opening of a valve for the first time and the opening of the valve for the second time (the 'period') is below 500 ms, or below 250 ms, or below 100 ms, or below 75 ms. The period may be between 50 ms and 500 ms, or between 50 ms and 250 ms, or between 50 ms and 100 ms. Preferably, the period is about 50 ms.

The valves are controlled so as to be able to fire continually to allow sustained flow of fuel from the source into the destination (e.g. the fuel consumer). Number of valve triggering events per time period (e.g. minute or hour) is determined by the length of the period. Vales operating with a period time of 500 ms to 50 ms would have between 120 and 1200 valve triggering events (valve opening and closing events) per valve per minute. Preferably, the valves have between 120 and 1200 valve triggering events per minute. Preferably around or at least 120 valve triggering events per minute, preferably at least 240 valve triggering events per minute, preferably at least 600 valve triggering events per minute, preferably at least 800 valve triggering events per minute. Preferably there are around or at least 1200 valve triggering events per minute.

In embodiments, the method is capable of dropping or decreasing the pressure of the fuel by at least 5 fold, i.e. the pressure of the fuel leaving the apparatus is 5 times less than the pressure of the fuel entering the apparatus. Preferably the apparatus is capable of decreasing the pressure of the fuel by at least 10 fold, or at least 15 fold, or at least 20 fold, or at least 30 fold, or at least 40 fold, or at least 50 fold. Preferably, the fuel pressure decreases from about 10 bar to between 0.2 and 0.6 bar, which is a decrease of between around 16.5 fold and around 33.3 fold, preferably pressure decreases from about 10 bar to between around 0.3 bar, which is a 33.3 fold decrease in pressure.

The method allows the regulation fuel pressure of continual gas flow from a source to a consumer or target, e.g. a fuel cell. The method allows in embodiments excess of 500 mL flow of fuel per minute, preferably excess of 1 litre flow of fuel per minute. Preferably, the method allows regulation of at least 100 mL flow per minute, preferably 500 mL flow per minute, preferably at least 1 litre flow per minute. A greater flow per minute may be used for those fuel cells of a relatively higher wattage, for example the method can be used to control fuel flow into fuel cells at 1.1 litre flow per minute for a 100 W fuel cell stack, or the method can be used to control fuel flow into fuel cells at 80 mL flow per minute for an 8 W fuel cell stack. For example, the method can be for use with fuel cells with a power rating of between 8 W and 100 W.

The method includes measuring the pressure of the fuel downstream of the second valve. The opening and closing of the valves can be determined by this downstream pressure, i.e. the valves can be opened when the pressure downstream of the regulator apparatus meets a required predetermined threshold. Preferably, when the is measured to have decreased to below a predetermined pressure threshold, the valves are triggered to open.

Particularly when the method for use with fuel cell it allows the flow rate of fuel into the fuel cell to be monitored and regulated. The flow rate is regulated by measuring the pressure decrease due to consumption of the fuel and adjusting accordingly. The greater the pressure decrease in the fuel the more the valves firing time or periods can be adjusted to allow for a greater fuel flow, and vice versa if the fuel pressure exceeds a predetermined threshold the valves firing time or periods can be adjusted to decrease the fuel flow.

According to a third aspect of the present invention, there is provided a method of measuring a volume of fluid flow, the method comprising: flowing a fuel through a fluid flow path defining a volume between a first and a second valve connected in series; and controlling each valve by opening and closing each valve in a pulsed manner; counting a number of opening or closing events of the first and second valve. All embodiments of the methods and apparatus as described above may also be applicable to this method, it is using largely the same equipment and concepts.

Preferably, the method includes measuring a pressure in the volume between the first and second valves. Preferably, the method includes controlling both valves in a pulse-width modulated manner.

Embodiments of the invention provide a way to measure or meter the amount of fuel, for example hydrogen gas, that has passed through a fluid flow path. This can be done by knowing the internal space volume, or the void, between the two solenoid valves and using a counting mechanism to measure the amount of fluid which has passed between the valves. The counting mechanism can count the amount of times the valves have opened and closed, and thus the volume of gas that has passed through in a set time frame can be calculated.

Specific embodiments of the invention will now be described by reference to the accompanying drawings, in which.

Figure 6A:
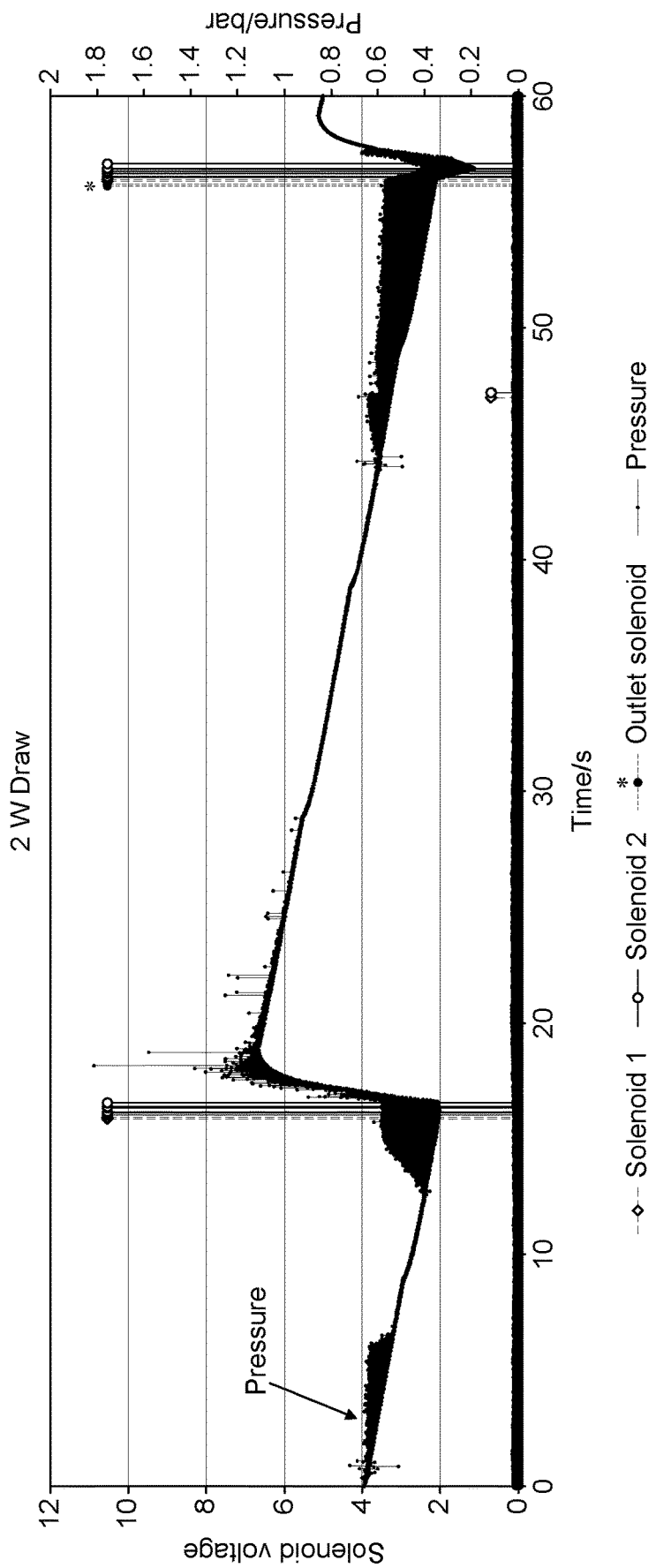
Figure 6B:
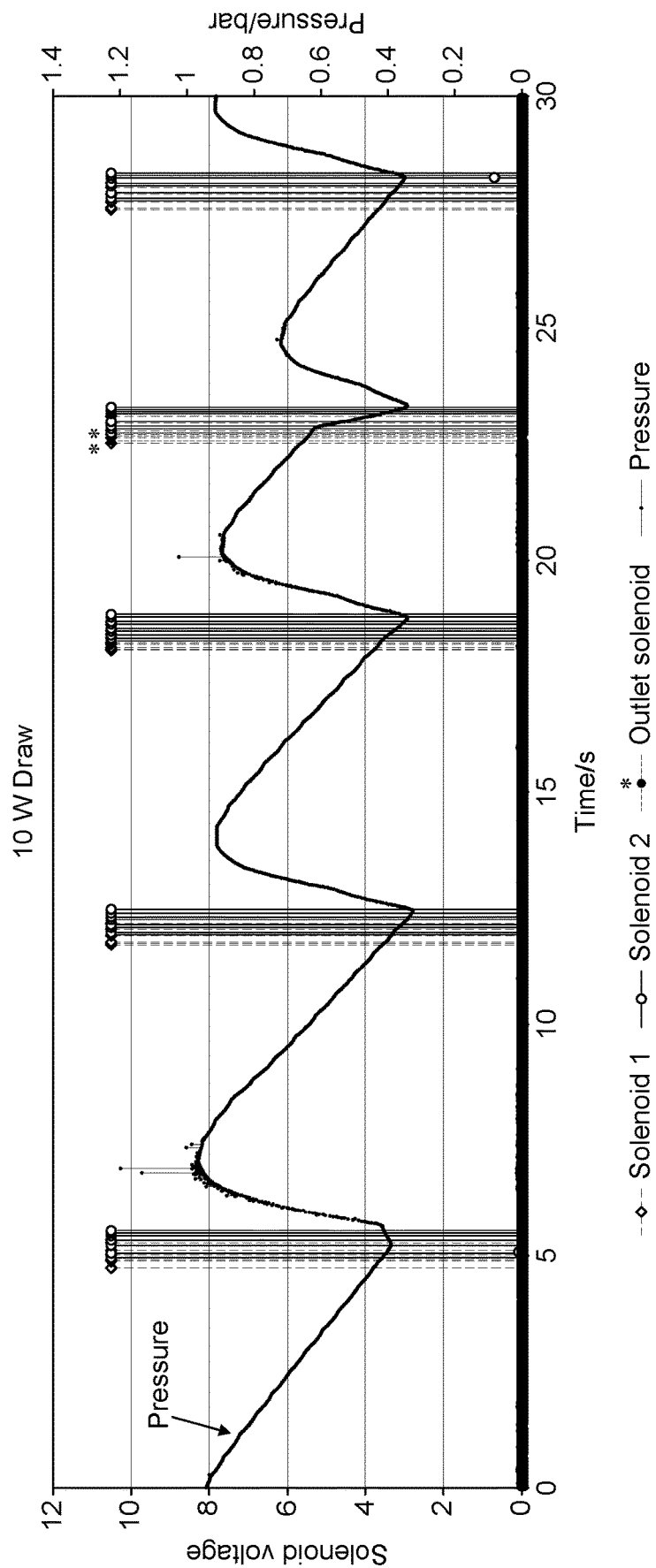
Figure 6C:
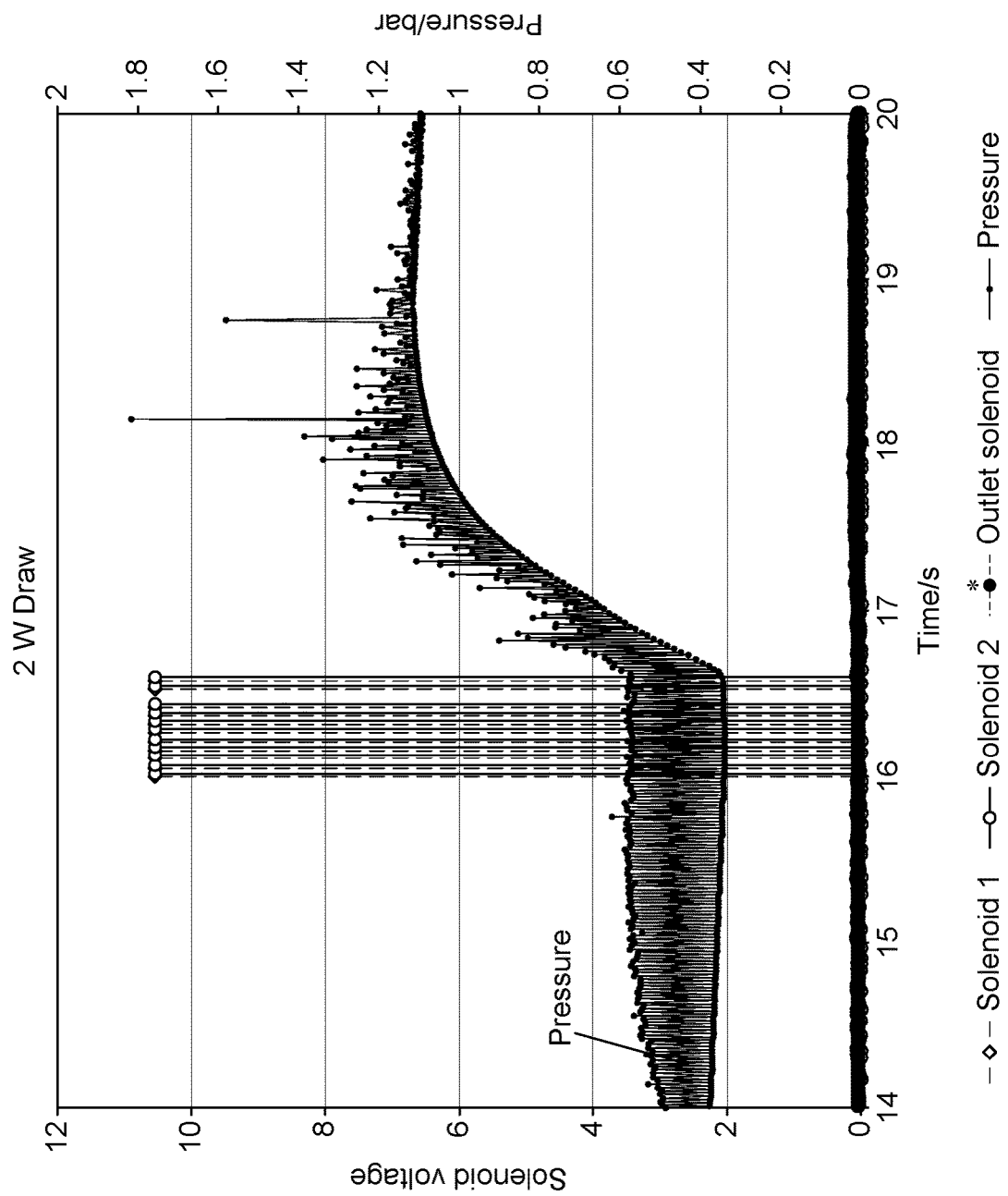
Figure 6D:
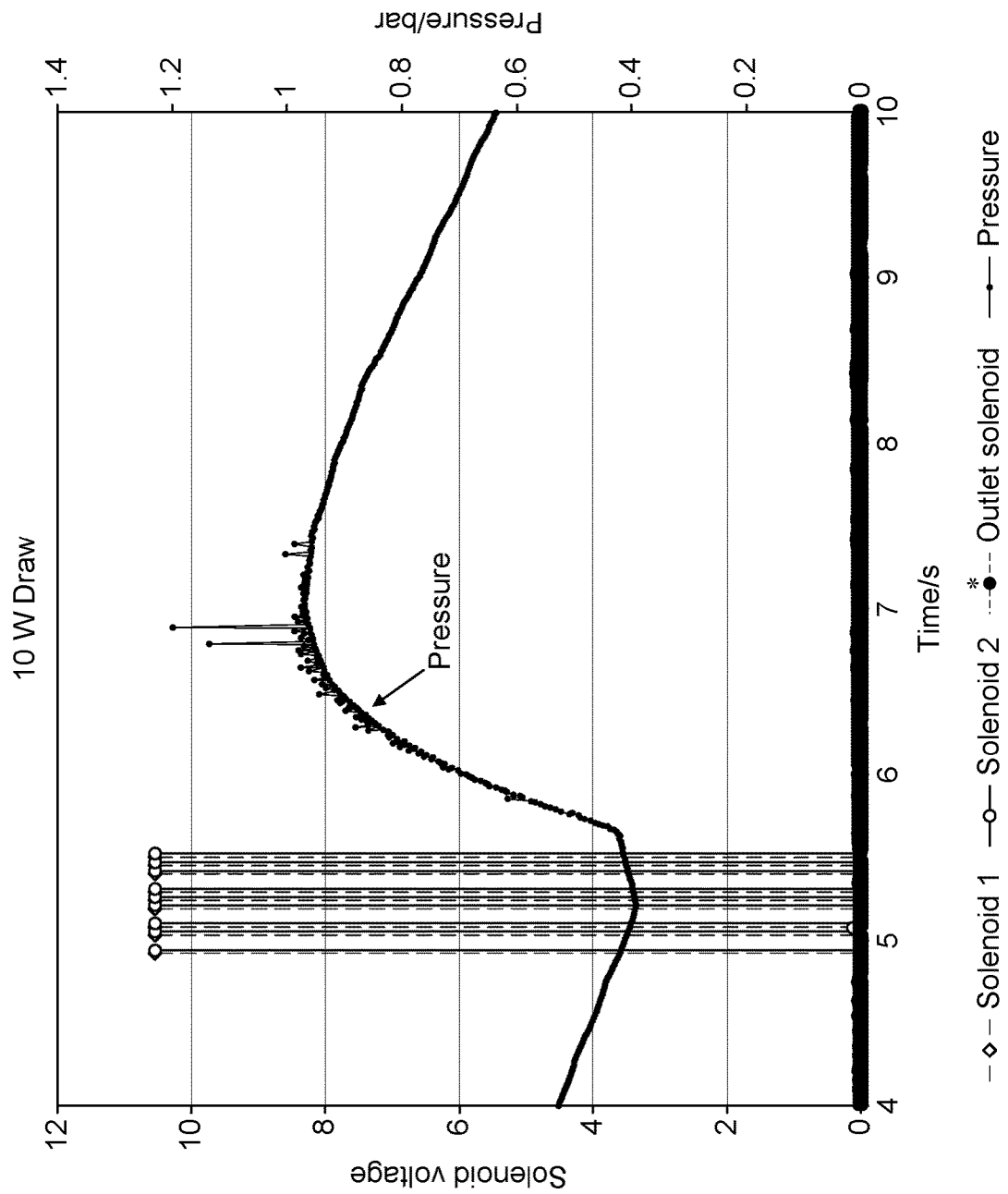
Figure 6E:
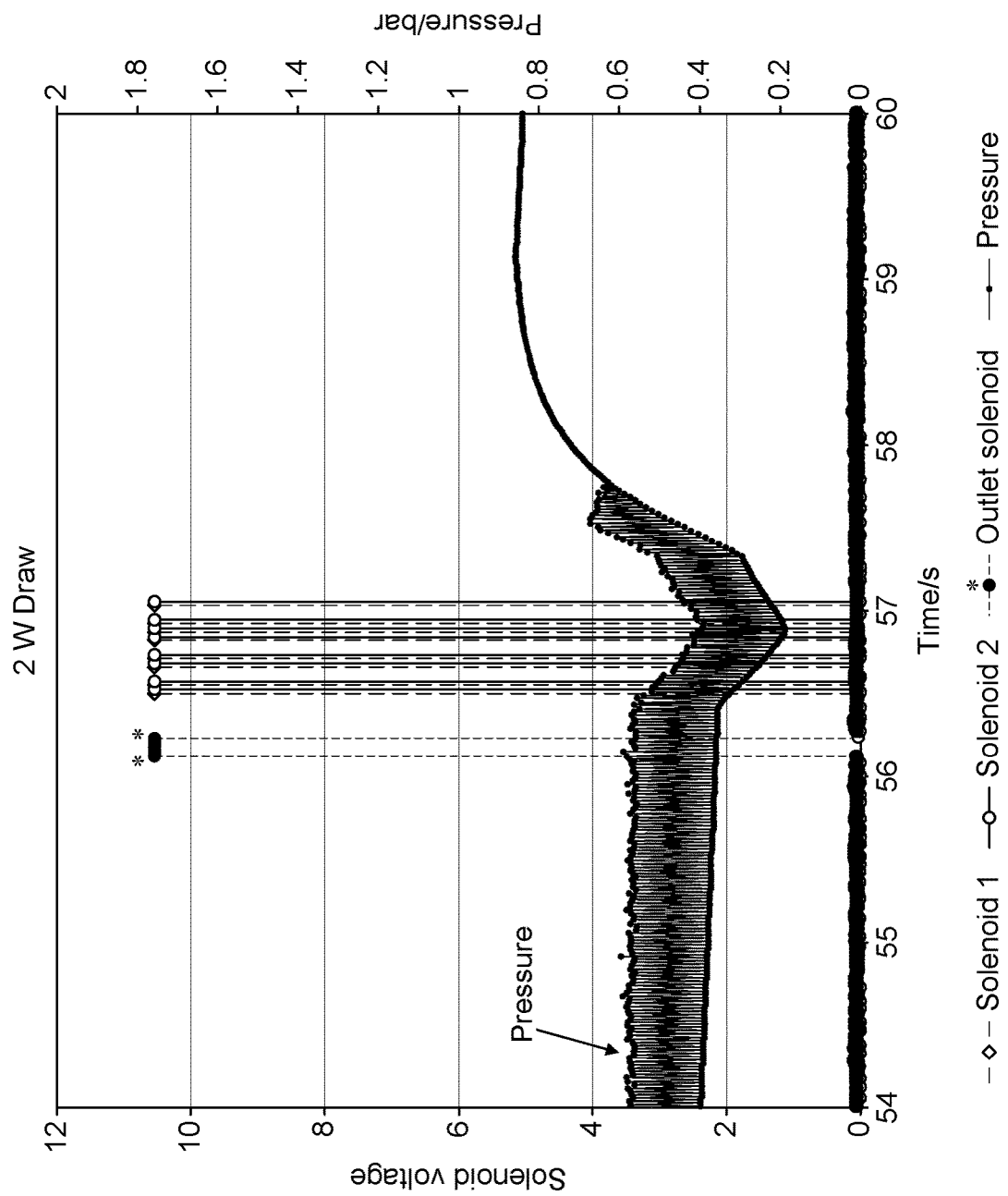
Figure 6F:
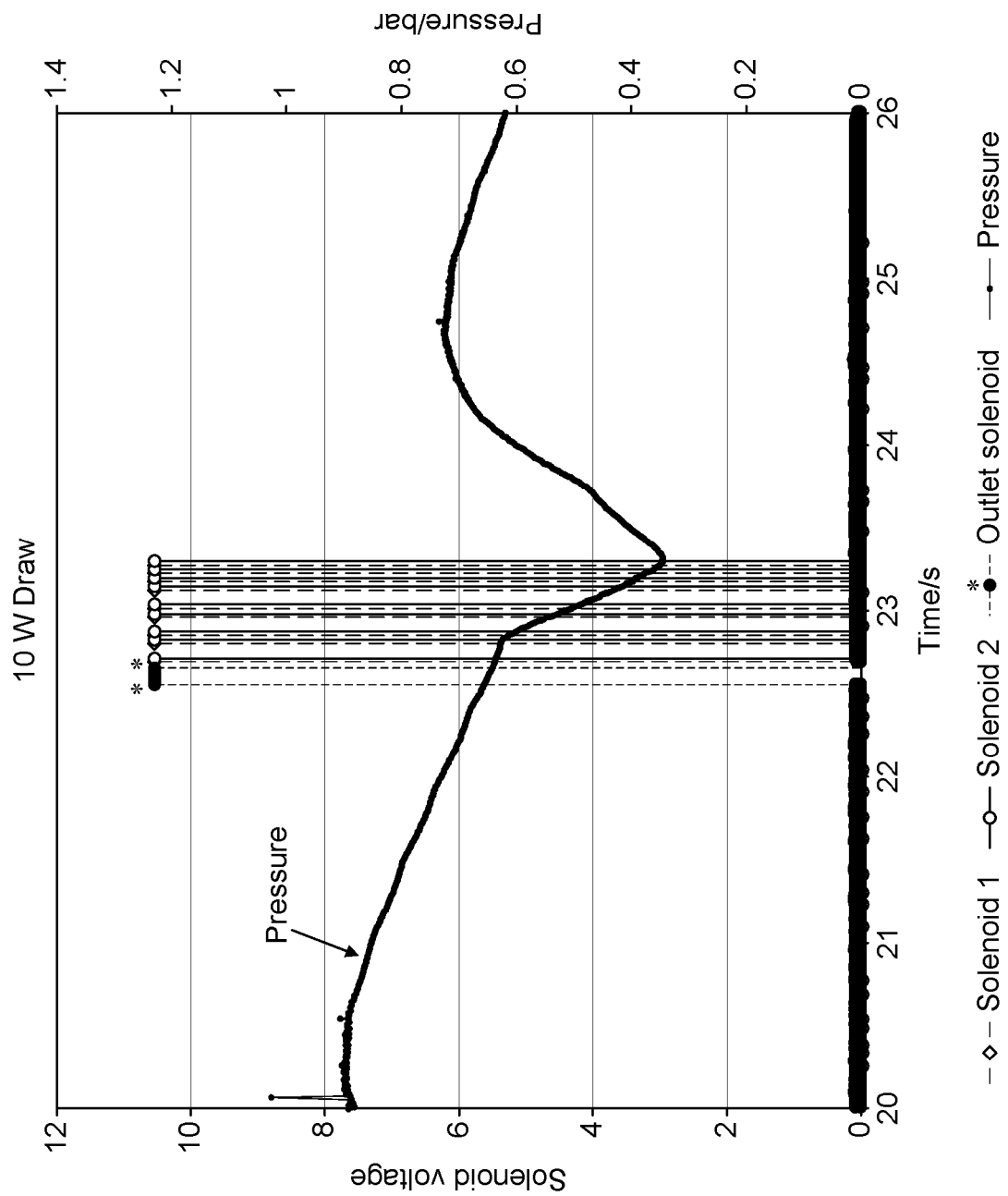
Figure 7:
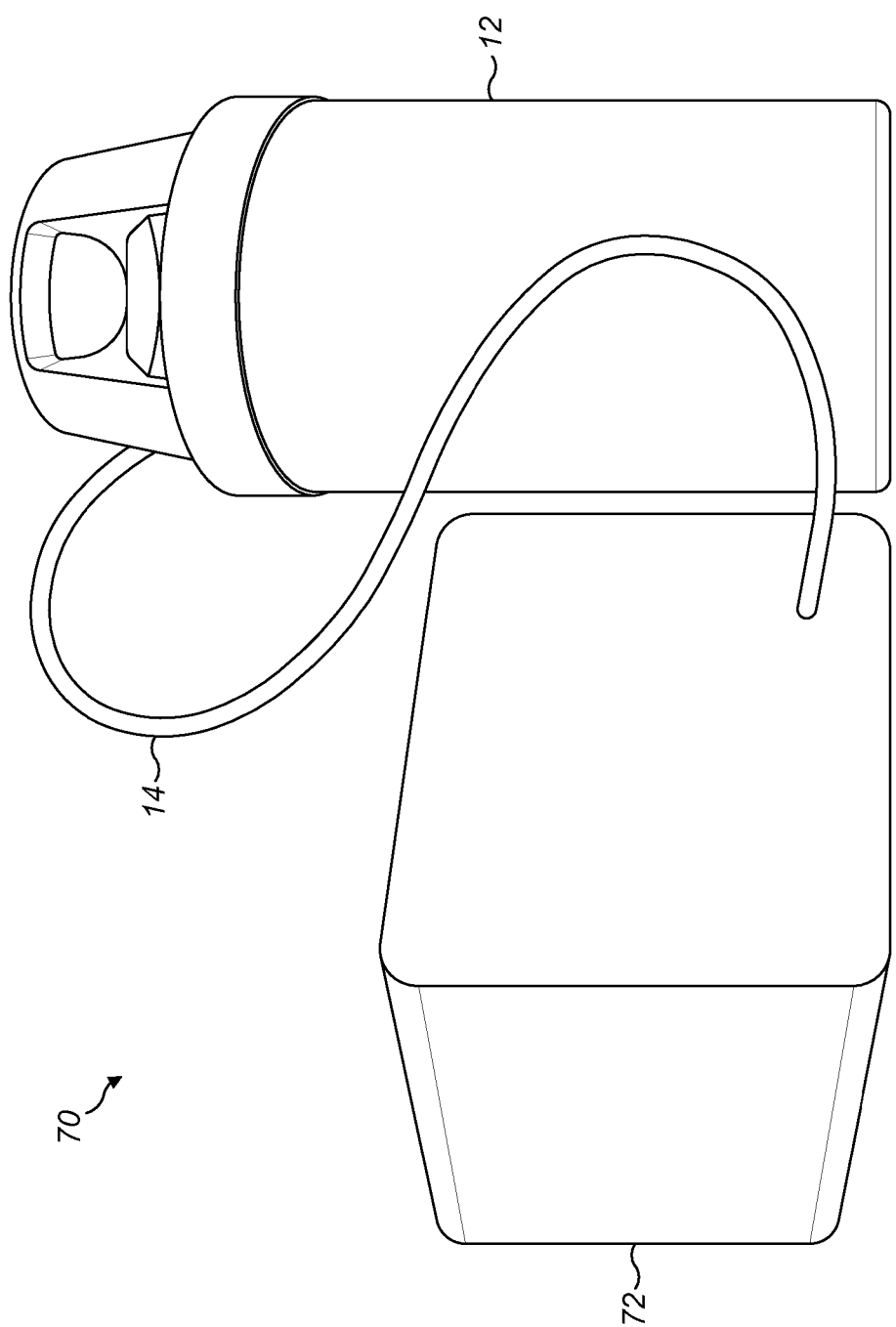

FIGS. 6A to 6F are graphs showing how solenoid triggering alters the pressure of the fuel over time, with FIG. 6A showing this for 2 W draw over 60 seconds, FIG. 6B showing this for a 10 W draw over 30 seconds, FIGS. 6C and 6D showing this zoomed in for the first solenoid triggering event and FIGS. 6E and 6F showing this for a later solenoid triggering event after an outlet valve purging event; and FIG. 7 is a schematic diagram of fuel cell according a third embodiment of the present invention and connected to a fuel supply.

The present techniques will be described more fully hereinafter with reference to the accompanying drawings. Like numbers refer to like elements throughout.

Figure 1:
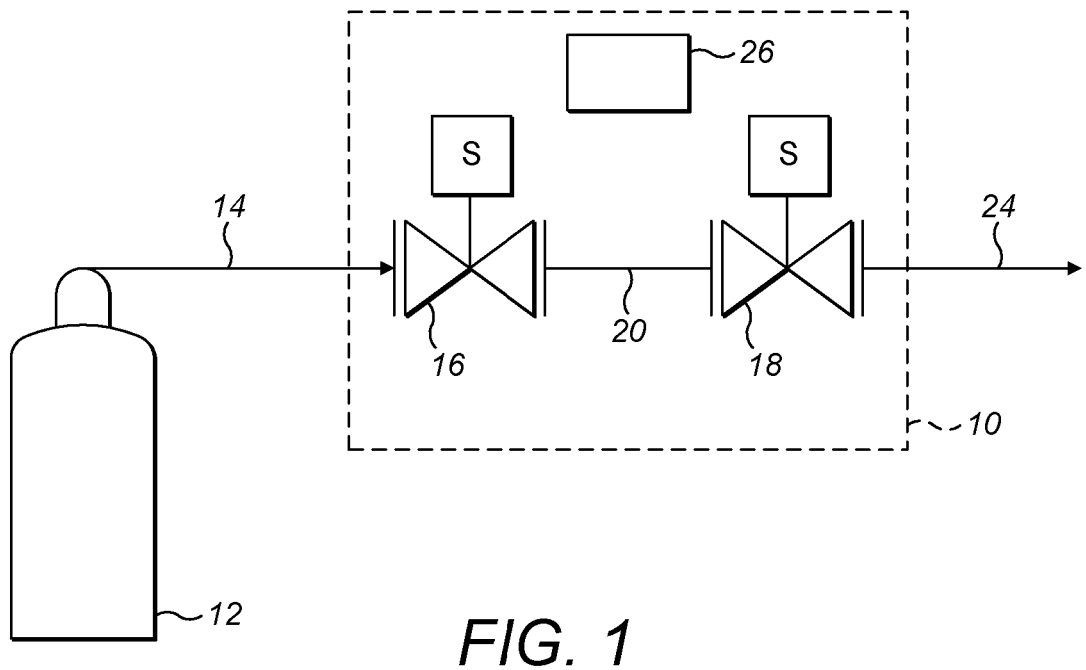
FIG. 1 is a schematic diagram of a fuel line input comprising two series connected solenoid valves according to a first embodiment of the invention.

FIG. 1 is a schematic diagram of a fuel pressure regulator (shown inside hatched box 10) connected to a fuel tank 12 by a fuel line 14. The fuel line 14 inputs fuel to fuel pressure regulator 10. The fuel pressure regulator 10 comprises two series connected solenoid valves 16, 18 and a controller 26 according to a first embodiment of the invention. An output of the two series connected solenoid valves 16, 18 is input to a fuel cell (fuel cell not shown in FIG. 1). There is a fixed, known volume 20, between the two valves, which may also be referred to as "the void" or "a void". The flow downstream of the regulator 10 is labelled 24.

The fuel tank 12 is a storage for the fuel. The fuel tank 12 is a pressurised fuel storage unit, for example a bottle or canister.

The fuel line 14 is a line or passage e.g. a pipe to bring or transport fuel from the fuel storage to the valves. The fuel line 14 inputs the fuel to the valves. The fuel line 14 may be considered to continue, or it may be considered that a second fuel line begins after the solenoid valves 16, 18 to take the fuel to its destination, e.g. to input the fuel to a fuel cell.

The flow downstream 24 of the regulator 10 takes fuel to a source, which could be to a fuel consumer, for example a fuel cell or a combustion engine.

The controller 26 controls the opening and closing of the valves 16, 18. The controller 26 is shown in FIG. 1 as a single controller as part of the fuel pressure regulator 10, but equally there may be two or more controllers 26 as part of the fuel pressure regulator 10. The controller or controllers 26 regulate the valves 16, 18, such as by controlling the opening and/or closing of the valves 16, 18 in a pulsed manner. Two or more controllers 26 may work together in a synchronised fashion to control two or more valves 16, 18, i.e. using a clocking mechanism. The controller 26 may be located physically near the valves 16, 18, or it may be physically remote to the valves 16, 18, for example located on a fuel cell or as part of an overall fuel cell control system. The connection between controller 26 and the valves 16, 18 is not shown in FIG. 1, but controllers 26 can be connected to valves 16, 18 in any way well known to those skilled in the art, such as through an electrical wired connection or a wireless connection.

A downstream pressure sensor (not shown) can measure the pressure of the fuel and adjust valves 16, 18 opening and closing or firing parameters according to the pressure of the fuel. The downstream pressure sensor may be in communication with the controller(s) 26, and provide feedback to regulate the opening of the valves 16, 18. The downstream pressure sensor may have a predetermined pressure threshold, and will trigger the regulator valves to open if pressure drops below this threshold pressure. In a system dealing with fuel dropping from 10 bar to between 0.2 and 0.6 bar, the predetermined pressure threshold may be set to 0.3 bar.

Figure 2:
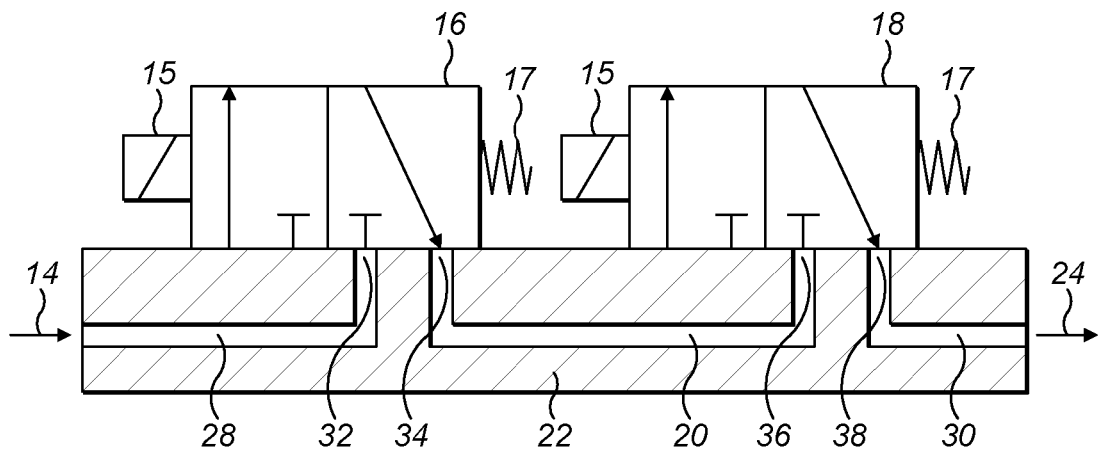
FIG. 2 is a schematic diagram of flow and pressure control solenoid valves.

FIG. 2 is a schematic diagram of the two solenoid valves 16, 18 of the fuel pressure regulator 10 of FIG. 1. FIG. 2 shows two circuit diagrams for two 3/2 solenoid valves 16, 18 attached to a metal block 22. Fluid pressure is regulated by these two "normally closed" solenoids 16, 18. The two valves 16, 18 shown are electrical coil operated solenoid valves and the solenoid coil 15 and the return spring 17 are labelled on both valves 16, 18.

The metal block 22 comprises fluid flow channel comprising several distinct sections. The two solenoid valves 16, 18 may be considered to intersect this flow channel through the block 22 and can act to regulate the pressure of the fuel flow along the fuel path as a whole.

Because the system acts to reduce the pressure, before the first solenoid 16 is a "high pressure side" 28 of the system, and after the second solenoid 18 is a "low pressure side" 30 of the system.

Fuel flow begins on the high pressure side 28 of the system. The fuel line 14 is connected to an input 32 of the first valve 16, so fuel from fuel line 14 can flow into the first valve 16. The output 34 of the first valve 16 is then connected to the volume 20 between the two valves 16, 18. The volume 20 is then connected to the input 36 of the second valve 18. The second valve 18 has an output 38 connected to the downstream flow 24, so fuel can flow downstream 24 out of the regulator system 10. The flow out of the second valve 18 is on the low pressure side 30 of the system.

"Normally closed" refers to valves which are closed when there is no power supplied to them. When power is supplied to them, the valves are opened. '3/2 solenoid valves' as shown in FIG. 2 are "3 way or 3 port solenoid" type valves, which are used to control flow of fluids, e.g. fuel. These act to move between two positions to divert flow from one path to another. In operation, embodiments of the present invention function as a fuel pressure regulator apparatus 10 as follows. Fuel, e.g. hydrogen gas, from the fuel tank 12 at a pressure of 200-300 bar flows through an initial standard pressure regulator (not shown in figure) which decreases the pressure to 10 bar or below. The fuel then passes down the fuel line 14 and onto the regulator 10, including the two solenoid valves 16, 18. In this exemplary embodiment of the invention, the high-pressure side works between 2 and 10 bar. The fuel decreases to a pressure of below 0.5 bar, or around 0.2 to 0.6 bars. If a pressure monitor is used to feedback into the system, then the predetermined threshold pressure can then be set around 0.3 bar.

In operation, when the solenoid electric coil 15 of each valve is de-energized, the valve (16 or 18) shuts off the flow of fuel to the intended destination. When the solenoid electric coil 15 is energized the flow is open, and then fuel will be allowed to flow through to the intended destination. When de-energised, an output of each valve 16, 18 is connected to a valve exhaust port (not shown in figure), which becomes blocked once the coil is energised. When energised, the valves 16, 18 will link fuel inputs 32, 36 and fuel outputs 34, 38 in each valve 16, 18 to allow fuel to flow through and out of the valves 16, 18.

Thus, fuel flow is enabled only when the solenoids 16, 18 are energised or triggered and thus opened. When normally closed they block the flow of fuel. When the controller 26 triggers the first solenoid 16 to open (i.e. when the electrical coil 15 is stimulated), fuel will flow from the high-pressure side 28 through the input 32 and output 34 of the first valve 16. The volume 20 between the valves 16, 18 will then be filled with fuel. When the controller 26 triggers the second solenoid 18 to open the fuel will flow out of the volume 20, through the input 36 and output 38 of the second valve 18, into the low pressure side 30 of the system 10 and downstream 24 of the pressure regulation system 10. The fuel will flow through the regulator system 10 in this manner because the overall flow through the system described herein is from higher pressure 28 to lower pressure 30.

In this manner, the action of the two valves 16, 18 reduces the pressure of the fuel. As a valve opens the act of the fuel flowing into the following space (whether that be a continuing fuel line 24, or the volume 20 between the two valves) reduces fuel pressure. In particular, the fuel flowing into the volume 20 between the valves 16, 18 reduces the pressure.

In an exemplary embodiment, in operation the first valve 16 and second valve 18 are not stimulated to open at the same time, so there is never a fully open flow path from the high-pressure side 28 to the low-pressure side 30. A fixed volume 20 between solenoids acts as a control volume between high-pressure 28 and low-pressure 30 sides.

In a further exemplary embodiment, in operation the first valve 16 and second valve 18 may be stimulated to open at the same time, but only for a relatively short period of time. The overlap in the two valves opening may be a relatively small percentage of the total opening time for either valves, for example less than 10% of the time either of the valves is open. In an exemplary embodiment, where the period (time for both valves to open and close) is around 50 ms, each valve is open for around 20 ms and the overlap time where both valves are open is around 4 ms.

Solenoid valves are capable of acting in a pulsed manner, opening and shutting quickly enough to allow fuel to pass through a valve but to also reduce the pressure of the fuel as the fuel passes through a valve. The pulsed manner of operation reduces the power usage of solenoid valves, as less power is needed than to keep valves open the whole time, as with the solenoid valves used in the prior art fuel cells. Thus, the valves 16, 18 described herein can be pulse-width modulated. The lifetime of solenoid valves means they are especially suited for use in these pressure regulation systems, opening and closing a sufficient number of times without needing to be serviced in order to last the lifetime of a fuel cell.

In the embodiments of the invention shown in FIGS. 1 to 4, there are two solenoid valves connected in series. Pressure regulation may also be achieved with other valves connected in series which are capable of acting in such a pulsed manner. For example, pneumatic type valves may be able to act sufficiently quickly in order to be used in these systems.

Figure 3:
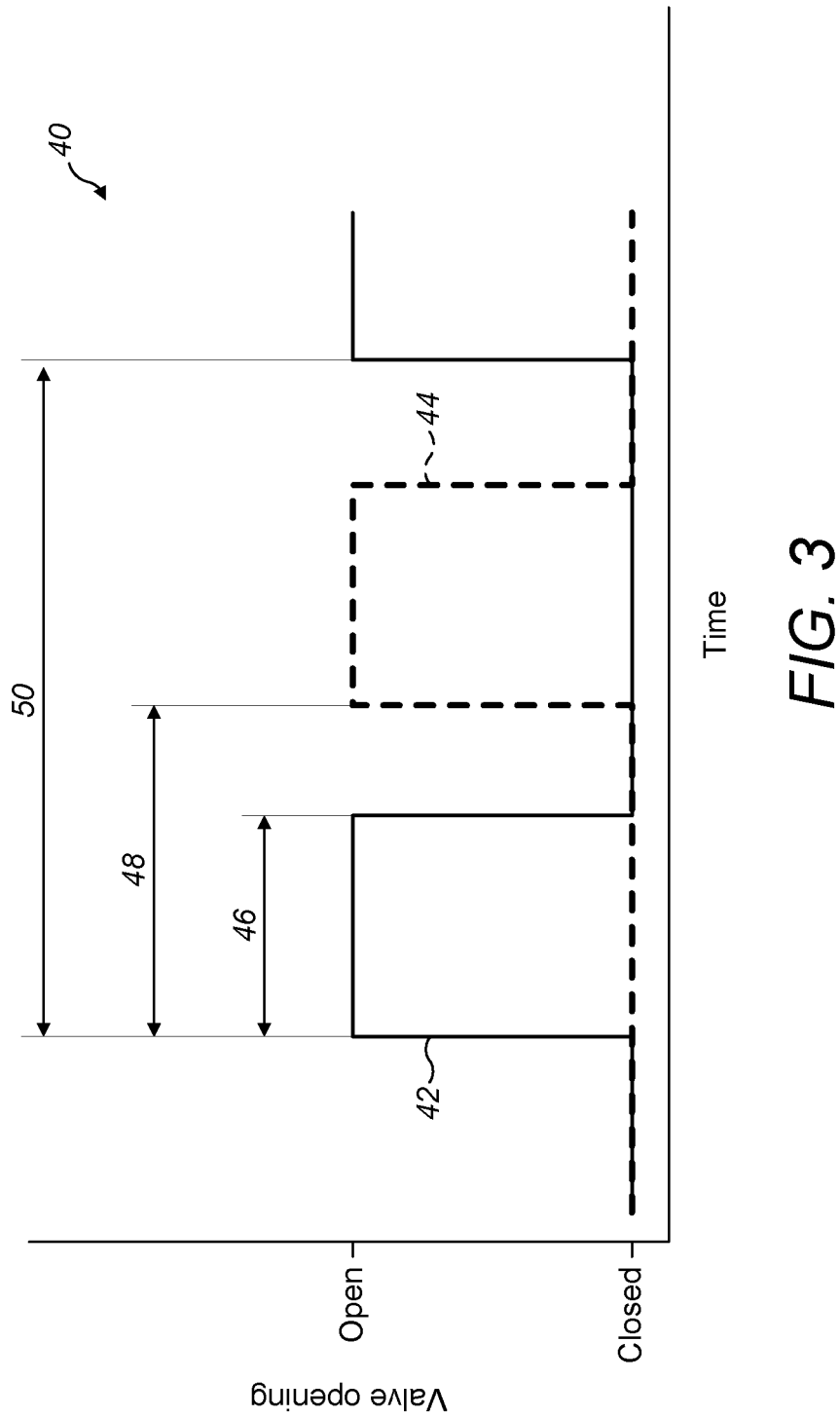
FIG. 3 is a graphical visualisation of the opening and closing of two solenoid valves in series, such as described in FIGS. 1 and 2.

FIG. 3 is a graphical visualisation 40 of the pulsed opening and closing of two valves in series, such as solenoid valves 16, 18 described in FIGS. 1 and 2. FIG. 3 shows pulse-width modulation operation of the two valves in operation.

A line representing the first valve (e.g. solenoid 16) is labelled as 42 and is shown with an unbroken line, the line representing the second valve (e.g. solenoid 18) is labelled as 44 and is shown with a dashed/broken line. The various times and parameters that are relevant to the control of the system are shown and labelled; a 'duty cycle' 46 of the first valve 16, a 'cycle lag' 48 and a 'period' 50 are shown. Time is represented on the x axis, to represent the passage of time as the two valves 16, 18 open and close. The opening and closing of the valves 16, 18 is represented on the y axis.

In this exemplary embodiment of the invention, the first solenoid valve 16 opens first, and the duty cycle 46 of this is labelled. The 'cycle lag' 48, between the opening of the first valve 16 and the opening of the second valve 18 is also show. The period 50, the time between the opening of the first valve 16 the first time and the opening of the first valve 16 the second time is also shown.

The first valve 16 is shown to open and then also close, before the first opening and subsequent closing of the second valve 18. After the second valve 18 closes the first valve 16 then opens again, for a second time shown on the graph. The second closing of the first valve 16 is not shown on the graph.

The duty cycle 46 for each valve (16, 18) is the duration of time a valve stays open. The cycle lag 48 is the difference in time between the opening of the first valve 16 and the second valve 18. The period 50 is the duration between opening events for a single valve, i.e. just for the first valve 16 or the second valve 18 acts alone. In order to ensure there is no direct flow from the high pressure side 28 to the low-pressure side 30, the cycle lag 48 time must not exceed the duty cycle 46 time, otherwise both valves 16, 18 would be open at the same time. Fuel would be free flowing and pressure would not be regulated if that were to happen. If both valves are to be open at the same time, it must only be for a period of time relatively short to the open time of both or either valves. This overlap time will allow a known volume of fuel to free flow through the regulator. This can be accounted for when calculating the operation parameters of the regulator and method of operation.

Between the two solenoid valves 16, 18 in the systems and methods of the present invention there is the known volume 20. The amount of fuel that fills the volume will depend on the duty cycle 46 of the valves 16, 18, or until the void equilibrates pressure with the upstream fuel.

Thus, the most effective way to control the flowrate of fuel is by controlling or setting the period 50. By reducing the period 50, flowrate will increase, and vice-versa. Moreover, by minimising the size of the volume 20, the pressure of the fuel can be more easily controlled, as fuel can fill the volume 20 between the two valves 16, 18 in smaller increments.

The larger the volume 20 the lower the pressure of the fuel will be, or the lower the spike in the pressure in the volume 20 when the fuel flows in, thus a longer cycle time will be needed to equilibrate the fuel pressure. The smaller the volume of the volume 20 is kept, the quicker the volume will equilibrate with the upstream side, and hence the duty cycle 46 can be kept low. Furthermore, a smaller volume 20 allows the incremental pressure increase of the fuel downstream of the regulator per cycle to be lower and hence allow a less varied, spiked or erratic pressure of the fuel during operation of the system. Furthermore, if the cycle time of both valves opening and closing is longer, the overall flow of fuel through a system is slower, and the pressure of the fuel will be more varied as it passes through the system. For example, when the volume is 0.1 $cm^3$, when this is pressurised to 10 Bar it is equivalent of 1 $cm^3$ of gas. Operators and users of such regulators and methods will be able to calculate the volume of gas desired to pass through the system, and design the system or method parameters accordingly. Parameters such as the volume will be known by any regulator (e.g. 26) controlling the operation of the valves.

In an exemplary embodiment of the invention, the cycle is as follows: the first solenoid 16 fires with an 8 ms pulse, there is a 20 ms pause and then the second solenoid 18 fires with an 8 ms pulse. Then 50 ms from the first solenoid 16 firing the downstream pressure of the fuel is measured and if the pressure is below a predetermined threshold then the valve opening cycle is re-triggered. If the pressure is above a predetermined threshold then the valves may not be triggered to open. The downstream pressure monitor will continue to measure the pressure and when the pressure decreases or drops below the predetermined pressure then the valve opening cycle is re-triggered. This allows monitoring of the downstream pressure so the system can account for variations and can control the flow of fuel.

In an exemplary embodiment of the invention there is a duty ratio of 0.1-0.5, with a cycle lag about 20-50% of the duty cycle.

The timings in FIG. 3 are shown to be symmetrical, i.e. the interval between the first valve 16 and the second valve 18 is the same as that for the other half of the period, and also the pulse width for the two valves are the same, although this is not altogether necessary.

As described above, when the first solenoid 16 opens, the volume 20 between the solenoids 16, 18 is filled with the upstream fuel. The amount of fuel that fills the volume 20 will depend on the duty cycle 34 of the first valve 16, or until the void equilibrates pressure with the upstream fuel. When the second solenoid 18 triggers, the fuel from the volume 20 fills the downstream side 24, i.e. the fuel-cell side.

An advantage of the presently described system is that the timing and cycles described herein are variable whilst the system is in operation, dependent on feedback from the system. The downstream pressure sensor may measure the pressure of the fuel and adjust the valve opening and closing or firing parameters. This allows a greater degree of fuel flow control than previously offered.

Figure 4:
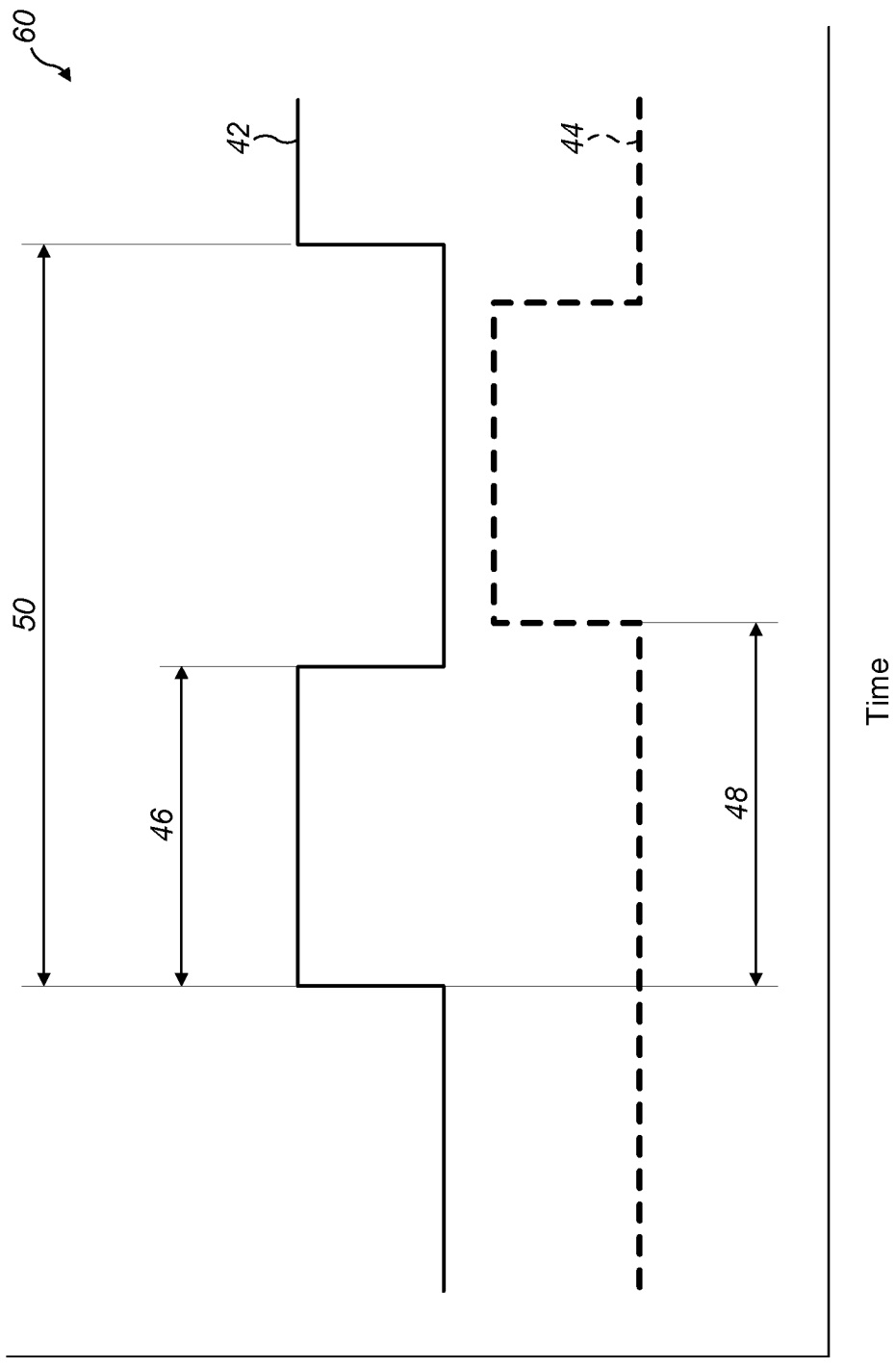
FIG. 4 is a further graphical visualisation of the opening and closing of the solenoid valves in series, such as described in FIGS. 1 and 2.

FIG. 4 is a further graphical visualisation 60 of the opening and closing of two valves, such as solenoid valves 16, 18 described in FIGS. 1 and 2.

The line representing the first valve 16 is again labelled as 42 and is shown with an unbroken line, the line representing the second valve 18 is labelled as 44 and is shown with a dashed/broken line. The various times and parameters that are relevant to the control of the system are also shown; the 'duty cycle', 46 of the first valve 16, the 'cycle lag', 48 and the 'period', 50 are shown. Time is represented on the x axis, to represent the passage of time as the two valves 16, 18 open and close. The opening and closing of the valves 16, 18 is represented on the y axis.

In FIG. 4 the opening of the first solenoid 16 and the second solenoid 18 are shown separated from each other on the same graph, unlike in FIG. 3, where they are shown on top of each other. As in FIG. 3, the first solenoid 16 is shown to open first, then close, closing before the opening of the second solenoid 18. The second solenoid 18 is shown to close before the first solenoid 16 opens for a second time. The second opening but not the second closing of the first solenoid 16 is shown on the graph.

Figure 5:
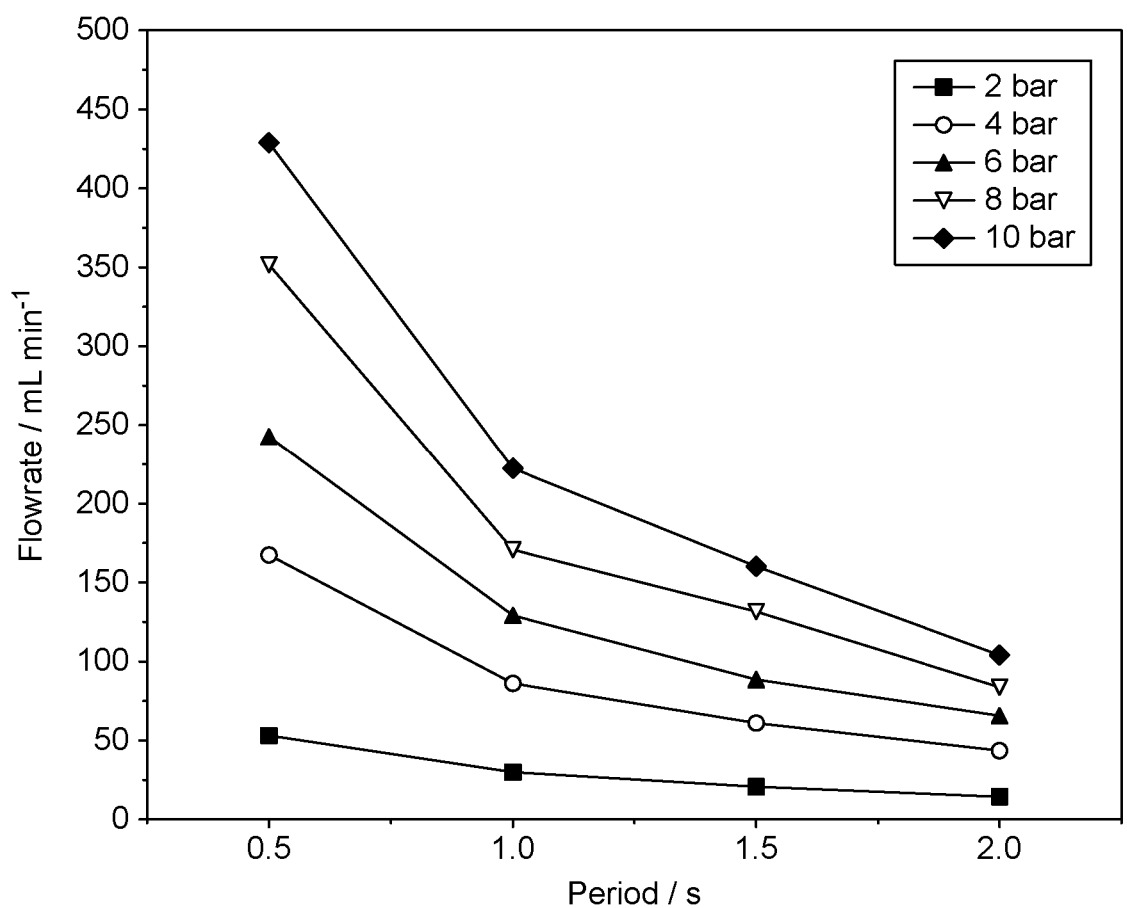
FIG. 5 is a graph of the relationship between flow rate and pulse period at different upstream pressures for two solenoid valves in series, such as described in FIGS. 1 and 2.

FIG. 5 is a graph of the relationship between flow rate and pulse period at different upstream pressures for two solenoid valves, 16, 18 in series, such as described in FIGS. 1, 2, 3 and 4. This graph, showing data generated in the design of these systems, shows that varying the period of two solenoid valves 16, 18 regulates the flow rate of fuel in such systems. Results of the effect of the period on flowrate at different upstream pressures are shown.

The period in seconds of the operation of the two solenoid valves 16, 18 is shown on the x axis of the graph of FIG. 5. The flowrate in mL per minute is shown on the y axis. Results for five different upstream pressure experiments are shown. 2 bar, 4 bar, 6 bar, 8 bar and 10 bar pressure results are shown, with the symbols detailed in the key.

Flow is enabled only when the solenoids 16, 18 are triggered, hence flowrate can be highly non-linear, particularly for longer periods. In order to determine a representative average flowrate for each period condition, an inverted cylinder was used to measure the flowrate out of the metal block. A minimum of one litre of gas or three minutes of operation was observed in order to measure an average gas flow rate whilst minimising error in measurement. For a two second solenoid period, this minimum restriction represents ninety solenoid triggering events.

Generally, higher flow rates are shown at higher pressures, as to be expected. Set ups with a reduced period also results in an increased flow rate, at all pressures.

From this data it is evident that there is a more or less linear relationship at periods of 1 second and above, simplifying the control of flow at low flow rates. Below 1 second there are fluid dynamic effects which cause de-linearity of this relationship. However, there is scope to decrease the period further, subject to the limitations of the solenoid hardware) in order to allow increased flowrates.

FIGS. 6A to 6F are graphs showing how solenoid triggering affects the pressure of the fuel over time. These graphs, showing data generated in the design of these systems, show how pulse width modulation of solenoid valves, as described herein, can be used to regulate the pressure of fuel as it is consumed in a fuel cell. These show control after reaching (dropping to) a pressure threshold due to consumption of fuel in fuel cell systems. The feedback loop between pressure and solenoid triggering is demonstrated with this data, demonstrating an advantage of the systems and methods described herein.

The pressure is recorded by an in-line pressure transducer which was also controlling the feedback loop triggering the solenoids; the solenoids are triggered when a lower pressure threshold is reached, until the pressure is topped up to a higher threshold value. The recording of the solenoid trigger events was enabled by measuring the voltage of the solenoids which again were being triggered by the feedback control system. The pressure is being measured after the second inlet solenoid and before the fuel cell.

Outlet solenoids are also present in the systems demonstrated in FIGS. 6A to 6F, to allow a timed (here every 30 seconds) purging event, purging build-up of unwanted water, nitrogen etc. in the fuel cell. In all figures shown the outlet solenoid is shown only triggering at the events marked with a star (*).

The x axis of the graphs show time in seconds, and the two y axis show i) the solenoid voltage (three solenoids shown, two inlet solenoid—solenoid 1 and solenoid 2—and one outlet solenoids which are normally closed; open when excited to 12 V) and ii) the pressure (bar) of the fuel as measured downstream from the two inlet solenoids but upstream from the outlet solenoid.

In all graphs the solenoid triggering events can be seen as the substantially vertical lines rising from the x axis, e.g. multiple events visible around 5 seconds in FIG. 6B. In all graphs the pressure is seen as the line snaking across the graph, substantially horizontal. Pressure is seen in all graphs decaying with time but rises as the solenoids trigger, flooding fuel through the apparatus into the fuel cell and raising pressure.

FIG. 6A shows the pressure of fuel for 2 W draw over 60 seconds in this context. When the pressure decays to a threshold the input solenoids are triggered (around 16 seconds), allowing more fuel to flow and thus the pressure increases again. Pressure then decays again as fuel is consumed before a further triggering of the solenoids. The second triggering of the solenoids is shown after the triggering of outlet valve (marked with a star) in a purge event as described above. After the purge event the solenoids trigger to increase fuel pressure after the purge event. The pressure line in this graph can be seen staring around 0.65 bar at time=0 seconds, dropping to around 0.375 bar at around 16 seconds. Pressure then rises sharply to around 1.2 bar by around 19 seconds, before dropping back down to around 0.375 bar by around 57 seconds.

FIG. 6B shows the pressure of fuel for 10 W draw over 30 seconds in this context. Pressure is shown to decay quicker due to the higher draw, higher wattage of fuel consumption (higher consumption rate of the fuel). When the pressure decays to a threshold the input solenoids are triggered (e.g. around 5 seconds, around 12.5 seconds, around 17.5 seconds), allowing more fuel to flow and thus the pressure increases again. Pressure then decays again as fuel is consumed before further solenoid triggering events. A purge event with outlet solenoid triggering is also shown in FIG. 6B, marked with a star. Again, after the purge event the solenoids trigger to increase fuel pressure after the purge event. The pressure line in this graph can be seen staring around 0.9 bar at time=0 seconds, dropping to around 0.4 bar at around 5 seconds. Pressure then rises sharply to around 1 bar by around 7 seconds, before dropping back down to around 0.35 bar by around 13 seconds. This cycle continues multiple times over the 30 seconds shown, the pressure line can be seen rising and falling.

The zoomed in cases presented are to highlight solenoid behaviour and show the pressure changes in more detail. Pressure can be seen rising and falling as described in FIGS. 6A and 6B. FIGS. 6C and 6D showing this zoomed in for the first solenoid triggering event of each draw from the previous graphs. FIGS. 6E and 6F show this for a solenoid triggering event which occurs after the outlet solenoid triggering, purging, event.

FIG. 7 is a schematic diagram of a fuel cell 62 according a third embodiment of the present invention and connected to a fuel supply. The fuel supply is shown as a fuel tank 12, which acts as a storage for the fuel. The fuel tank is connected to a fuel cell 62 by a fuel line 14 to input fuel into the fuel cell. A fuel pressure regulator 10 such as of the resent invention is not shown on the picture.

It will be clear to one skilled in the art that many improvements and modifications can be made to the foregoing exemplary embodiments without departing from the scope of the present technique.

For example, in a further aspect of the invention there is provided a cell assembly incorporating a system as described above, with a fuel source to deliver fuel to the control system, and a fuel cell.

Preferably, the fuel enters the system at a pressure of between 2 and 10 bar. Preferably, the fuel leaves the system at a pressure of between 0.2 to 0.6 bar. However, in systems scaled larger or smaller, the system, apparatus and methods of the present invention could be used with fuels of higher and lower pressures.

Preferably, the fuel cell has a power output in the range of 10-100 W.

A fuel pressure regulator of the present invention may be connected to a downstream sensor. The sensor may take a measurement downstream of the valves, measuring a pressure of the fuel after it has flowed through the valves. This can then be fed back into the regulator to control the opening and closing of the valves, in particular in order to further reduce or allow an increase in pressure of the fuel. The downstream sensor may be a pressure sensor, such as those known to those skilled in the art. A valve regulator capable of controlling the opening and closing of valves would also be known to those of skill in the art.

The measurement or counting of the fluid can be made more accurate by incorporating a measurement device into the system. The measurement device can intersect the volume between solenoids. The measurement device could be a pressure sensor. Using a pressure sensor would depend on the upstream and downstream pressure from the valves. Knowing this and knowing using a pressure sensor to measure the pressure in the volume would mean the flow amount can be calculated.

A pressure sensor used to measure the pressure in the volume between the two valves could replace other pressure sensors usually found in such systems, e.g. downstream pressure sensors as part of a regulator as described above.

With the diagram regulators used in the prior art, there is no indication of how much fuel has passed through the regulator(s). It is possible to back-count from the fuel cell, or measure how much fuel has left the fuel storage unit, but this doesn't accurately account for losses on the way.

This information could be communicated to a user of such a system or a method, for example via a fuel cell control system. This can indicate to a user when a fuel storage unit is running low on fuel, or help calculate how efficient a system is being.

Such calculations are possible once the system has equilibrated, because the amount of fuel passing through is known once the system reaches equilibrium. The time taken to equilibrate will depend on a number of factors such the pressures of the fuel before and after the valves, fuel types and the physical parameters of the system.

The methods and systems described herein may use more than two valves in series to regulate the fuel pressure, for example, 3, 4, 5, 6 or more valves in series. In particular in larger systems or systems operating at a higher pressure than a small-scale fuel cell, there may be particularly advantages of using 3 valves in series to regulate the pressure in the system. More than 2 valves may be particularly suitable when there is no pressure regulator on the fuel source, or when the fuel is stored at a high pressure. For example, in a system where the fuel is stored at 300 bar pressure, reducing the pressure using 3 valves may be advantageous.

Systems and methods in accordance with the invention can be used in fuel-cell assemblies of differing power output capabilities. The fuel cells utilising such a system could be used in fuel cells capable of, for example, 200 W of power output, of 150 W power output, of 100 W power output, of 90 W power output, of 80 W power output, of 70 W power output, of 60 W power output, of 50 W power output, of 40 W power output, of 30 W power output, of 20 W power output, of 10 W power output, of 5 W power output. This is the maximum power output of the fuel cells, cells can be set to the power output required as necessary.

Systems and methods in accordance with the invention have particular advantages when used with 200 W or below fuel cells. Smaller fuel cells see particularly advantages due to the power saving by using these systems and methods. For example, a 2 W saving is in percentage terms less of an energy saving on a 1000 W power output fuel cell when compared to a 100 W power output fuel cell, but it is still a saving and may be worth incorporating depending on requirements.

The valves of the systems and methods of the present invention use under 100 mW of power, or under 90 mW of, or under 80 mW of power, or under 70 mW of power, or under 60 mW of power, or under 50 mW of power, or under 40 mW of power. Valves vary in size from 10 mL to 20/25 mL, the orifice size of a valve for use in the fuel cells as described herein is typically about 0.5 mm in diameter.

Pulse width-modulated solenoid valves can go through 500 million cycles, which is more than enough to last the 3 to 5 year inspection/replacement cycle that diaphragm valves would go through.

Also, with two valves in series, advantageously each can be isolated for testing/diagnostics to be run on a single valve at a time. This is not possible in the diaphragm valve type systems of the prior art. Systems of the present invention can include electronics running continuously or intermittently to check the movements of the (individual) valves in ordinary use. Systems can run in-line diagnostics to monitor the valves, individually or together.

Although the invention as exemplified uses hydrogen as the fuel, this valve arrangement and methods could be used with all pressurised fluids. As used herein "fluid" refers to a substance that has no fixed shape and yields easily to external pressure, for example a gas or a liquid. Fuels for use with the systems and methods as described herein are fluids. These fuels can be hydrogen or a hydrogen-containing mixture, or a hydrocarbon or hydrocarbon derivative. Fuels could be other gaseous fuels, such as methane or propane. Fuels could be other gaseous fuels, such as methane or propane and fluids include oxidants such as air and oxygen.

The systems and methods can be used with pressurised fuel storage units or containers, as are well known in the art. The fuel can be stored in a pressurised storage unit, for example a bottle or canister. These can be, for example at a pressure of between 700 and 10 bar. In particular the fuel storage units can be suitable for use with fuel cells as described herein, i.e. at a pressure of between 150 and 350 bar.

The invention claimed is:

1. A fuel cell comprising a fuel pressure regulator apparatus on a fuel input line of the fuel cell, the fuel pressure regulator apparatus comprising:
   a first and a second valve connected in series by a fluid flow path defining an open volume between the first and second valves;
   a pressure monitor device downstream of the second valve; and
   a controller connected to each of the first and second valves for opening and closing each of the first and second valves in a pulsed manner;
   wherein the first and second valves are normally closed solenoid valves; and
   wherein the controller is configured to open the second valve only when the first valve is closed.

2. A fuel cell as claimed in claim 1, wherein an output of the first valve is connected to an input of the second valve by the fluid flow path, the fluid flow path defining a fixed volume between the first and second valves.

3. A fuel cell as claimed in claim 1, wherein the controller is configured to control both the first and second valves in a pulse-width modulated manner.

4. A fuel cell as claimed in claim 1, wherein the fluid flow path is formed as a fluid flow channel within a substrate.

5. A fuel cell as claimed in claim 1, wherein the open volume is 0.1-5cm$^3$.

6. A fuel cell as claimed in claim 1, wherein the fluid is a gas.

7. A fuel cell as claimed in claim 1, wherein the fuel pressure apparatus decreases the pressure of the fuel by at least 5 fold.

8. A fuel cell as claimed in claim 1, wherein the first and second valves undergo between 120 and 1200 valve opening an closings per minute.

9. A fuel cell as claimed in claim 1, wherein the fuel cell has greater than 50 mL of fuel flow per minute and;
   a power rating of between 8 W and 100 W.

10. A fuel cell as claimed in claim 1, further comprising a fuel line having a high-pressure side connected to an input of the first valve and a low-pressure side connected to an output of the second valve.

11. A fuel cell as claimed in claim 10, wherein the high-pressure side and low-pressure side are formed at least partially as fluid flow channels within a substrate.

12. A fuel cell as claimed in claim 11, wherein the valves are disposed on a surface of the substrate.

13. A method of regulating fuel pressure in a fuel cell comprising:
   flowing a fuel through a fluid flow path defining a volume between a first and a second valve connected in series where the output of the first valve directly inputs to the input of the second valve and wherein the first and second valves are normally closed solenoid valves;
   monitoring the pressure of the fuel downstream of the second valve; and
   controlling each valve by opening and closing each of the first and second valves in a pulsed manner,
   wherein the second valve is only opened when the first valve is closed.

14. A method as claimed in claim 13, comprising controlling both the first and second valves in a pulse-width modulated manner.

15. A method according to claim 13, wherein the time gap between the closure of one of the first and second valves and the opening of an other of the first and second valves is less than 100 ms.

16. A method according to claim 13, wherein the pulse time of each of the first and second valves is between 1 ms and 15 ms per valve or,
   wherein the time to open and close both the first and second valves is between 50 ms and 500 ms, or
   wherein the first and second valves undergo between 120 and 1200 valve opening and closings per minute.

17. A method according to claim 13, wherein the method decreases a pressure of the fuel by at least 5 fold.

18. A method according to claim 13, wherein the fuel has greater than 50 mL of fuel flow per minute and a power rating between 8 W and 100 W.

19. The method according to claim 13, wherein the method further comprises measuring a volume of fluid flow, the method comprising:
   controlling each of the first and second valves by opening and closing each of the first and second valves in a pulsed manner; and
   counting a number of opening or closing events of the first and second valve.

20. A method as claimed in claim 19, comprising measuring a pressure in the volume between the first and second valves.

* * * * *